(12) United States Patent
Gallimore et al.

(10) Patent No.: US 9,470,262 B2
(45) Date of Patent: Oct. 18, 2016

(54) BEARING ARRANGEMENT AND METHOD

(71) Applicant: ROLLS-ROYCE PLC, London (GB)

(72) Inventors: Stephen Gallimore, Lincoln (GB); Paul Fletcher, Rugby (GB); John Richard Webster, Derby (GB); Alan Robert Maguire, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/631,245

(22) Filed: Feb. 25, 2015

(65) Prior Publication Data
US 2015/0267744 A1    Sep. 24, 2015

(30) Foreign Application Priority Data

Mar. 19, 2014  (GB) .................................. 1404876.3

(51) Int. Cl.
| | | |
|---|---|---|
| F16C 27/04 | (2006.01) | |
| F16C 25/08 | (2006.01) | |
| F01D 25/16 | (2006.01) | |
| F16C 41/02 | (2006.01) | |
| G01M 13/04 | (2006.01) | |
| F16C 33/58 | (2006.01) | |
| F16C 19/54 | (2006.01) | |
| F16C 19/16 | (2006.01) | |
| F16C 19/52 | (2006.01) | |
| F16C 27/08 | (2006.01) | |

(52) U.S. Cl.
CPC ........... *F16C 25/083* (2013.01); *F01D 25/162* (2013.01); *F16C 33/586* (2013.01); *F16C 41/02* (2013.01); *G01M 13/04* (2013.01); *F05D 2240/52* (2013.01); *F05D 2260/83* (2013.01); *F05D 2300/501* (2013.01); *F16C 19/16* (2013.01); *F16C 19/522* (2013.01); *F16C 19/54* (2013.01); *F16C 27/08* (2013.01); *F16C 2360/23* (2013.01); *Y02T 50/671* (2013.01)

(58) Field of Classification Search
CPC .. F16C 19/547; F16C 25/083; F16C 27/066; F16C 41/02; F16C 2360/23; F01D 25/164
USPC .......................... 384/517, 535, 536, 581, 582
See application file for complete search history.

(56) References Cited

U.S. PATENT DOCUMENTS 3,738,719 A * 6/1973 Langner .................. F16C 19/54
                                                          384/517
4,501,454 A    2/1985 Dennis et al.
(Continued)

FOREIGN PATENT DOCUMENTS

DE       2718861 A1 * 11/1978 ............... F16C 19/54
EP       0010371 A1 *  4/1980 ............... A61C 1/05
(Continued)

OTHER PUBLICATIONS

Jul. 15, 2015 Partial Search Report issued in European Patent Application No. 15 15 6324.
(Continued)

*Primary Examiner* — Phillip A Johnson
(74) *Attorney, Agent, or Firm* — Oliff PLC

(57) ABSTRACT

A bearing arrangement comprises: first and second thrust bearings, each including an inner race which is disposed on a shaft and an outer race which is supported by at least one resilient element. Applying a shaft thrust load elastically deforms the resilient elements so as to axially displace the respective outer races in order that the thrust load is shared between the first and second thrust bearings.

13 Claims, 15 Drawing Sheets

(56) References Cited

U.S. PATENT DOCUMENTS

| | | | |
|---|---|---|---|
| 4,578,018 A | | 3/1986 | Pope |
| 4,676,667 A | * | 6/1987 | Komatsu ............... F01D 25/16 384/517 |
| 5,316,393 A | | 5/1994 | Daugherty |
| 5,749,700 A | * | 5/1998 | Henry .................. F01D 25/168 310/90.5 |
| 5,836,739 A | | 11/1998 | Haramura et al. |
| 5,977,677 A | | 11/1999 | Henry et al. |
| 6,325,546 B1 | * | 12/2001 | Storace ................. F01D 21/04 384/536 |
| 6,964,211 B1 | * | 11/2005 | St. Myer ................. B62D 1/16 280/779 |
| 8,083,472 B2 | | 12/2011 | Maguire |
| 2004/0170350 A1 | * | 9/2004 | McCallum .............. F16C 19/54 384/536 |
| 2012/0111024 A1 | * | 5/2012 | Kachinski ............. F01D 25/162 60/805 |
| 2013/0129504 A1 | | 5/2013 | Heldner |
| 2013/0280063 A1 | | 10/2013 | Ganiger et al. |

FOREIGN PATENT DOCUMENTS

| | | | | |
|---|---|---|---|---|
| EP | 2 194 238 A1 | | 6/2010 | |
| EP | 2 821 657 A1 | | 1/2015 | |
| GB | 191127465 A | * | 0/1912 | ............. F16C 19/54 |
| GB | 965465 A | | 7/1964 | |
| GB | 1344318 A | | 1/1974 | |
| JP | H11-62953 A | | 3/1999 | |
| WO | 2011/139310 A2 | | 11/2011 | |

OTHER PUBLICATIONS

Oct. 20, 2014 Search Report issued in United Kingdom Application No. GB1404876.3.

* cited by examiner

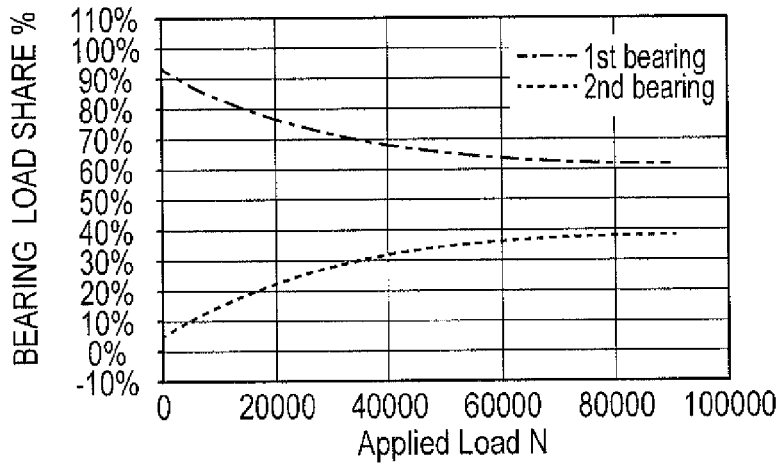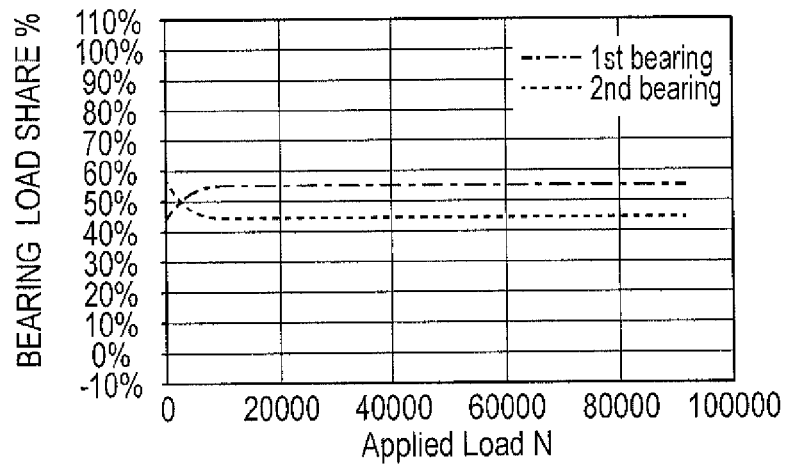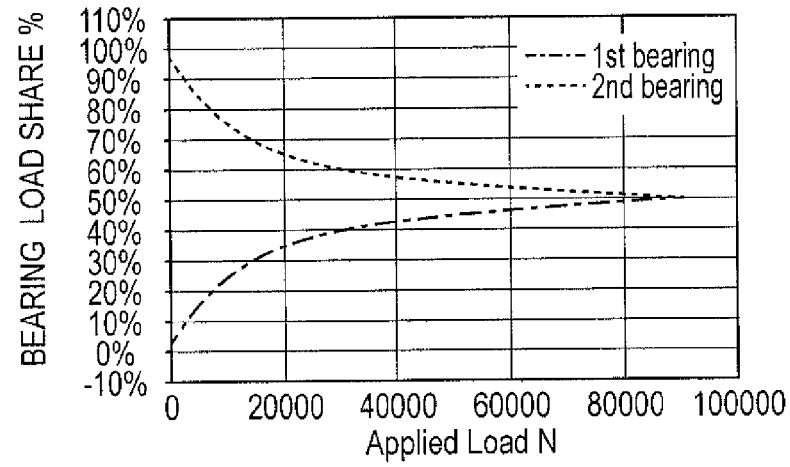
FIG. 8

BEARING ARRANGEMENT AND METHOD

The present invention relates to a bearing arrangement, in particular a load sharing bearing arrangement and the determination of loads thereon.

Rotating shafts, such as those used in gas turbine engines, typically require bearings to support relatively moving or rotating components. Where light weight and minimum power loss from friction are required, rolling element bearings are common and may be used to react both radial and thrust loads.

Since single bearings inevitably have a limited thrust capability, two or more bearings may be arranged adjacent one another to share the thrust load. In these so-called "stacked" bearing arrangements, small variations (of the order of a few microns in some cases) in the geometry of the sets of rolling elements or bearing races between the bearings can lead to one bearing taking more of the load than the other(s). Furthermore, under-loading of one set of rolling elements may result in "skidding" of that set, which may cause damage, debris release and bearing failure. For these reasons, the geometry of the rolling elements and bearing races of the different bearings needs to be carefully controlled and matched so that the load may be shared (ideally equally) between the bearings. This requirement to precision-engineer and match bearings in pairs (or other multiples) incurs costs in the manufacturing and supply chain.

Furthermore, the materials of the rolling elements and/or bearing races may expand in use due to heating, which can exacerbate further the geometrical variations and lead to a "runaway" effect in which one bearing takes progressively more of the load, potentially resulting in bearing failure. This may occur even if matched bearings are selected and installed because even very small geometrical variations between the bearings may be magnified under the severe environmental operating conditions in gas turbine engines.

In addition, it is not possible to determine the actual in-service loads which are exerted on each of the bearings, meaning that adverse operating conditions may go undetected. In order to compensate for this uncertainty, it is necessary to design the bearings with large over-capacity.

It is an object of the invention to alleviate the problems of the prior art at least to some extent.

The invention is set out in the accompanying claims.

According to an aspect, there is provided a bearing arrangement, comprising: first and second thrust bearings, each including an inner race which is disposed on a shaft and an outer race which is supported by at least one resilient element; wherein applying a shaft thrust load elastically deforms the resilient elements so as to axially displace the respective outer races in order that the thrust load is shared between the first and second thrust bearings.

The supporting resilient elements enable the axial thrust load to be shared between the first and second thrust bearings, such that geometrical variations and/or differential expansions between the thrust bearings may be tolerated. Hence, the requirement for careful control and matching of bearings is eliminated, or at least relaxed.

The resilient elements may be elastically deformed such that the thrust load is substantially equally shared between the first and second thrust bearings.

The outer race of each of the first and second thrust bearings may be supported by two resilient elements. Or, the outer race of each of the first and second thrust bearings may be supported by four resilient elements. The four resilient elements may be arranged in pairs.

Each of the resilient elements may extend substantially perpendicularly to the axial direction, when in an undeformed condition. Or, each of the resilient elements may be inclined relative to an imaginary line which extends perpendicularly to the axial direction, when in an undeformed condition.

Each of the resilient elements may be within the projected axial length of the respective thrust bearing, when in an undeformed condition. Each of the resilient elements may extend beyond the projected axial length of the respective thrust bearing, when in the elastically deformed condition.

The resilient elements may comprise diaphragms. Or, the resilient elements may comprise beams or radially-extending fingers. The diaphragms, or the beams or radially-extending fingers, may be generally flat, or curved.

The bearing arrangement may comprise three or more thrust bearings.

The bearings may be axially spaced on the shaft. A spacer element may be disposed between the inner races to define the axial distance between the thrust bearings.

The thrust bearings may be ball bearings, tapered cylindrical roller bearings, hydrostatic bearings, or hydrodynamic bearings.

The outer races may be supported by the respective resilient elements on a bearing housing of a gas turbine engine.

According to another aspect, there is provided a gas turbine engine, comprising a bearing arrangement as described herein above.

According to another aspect, there is provided a bearing arrangement, comprising: first and second thrust bearings, each including an inner race on a shaft and an outer race which is supported by at least one resilient element; wherein applying a shaft thrust load axially displaces the outer races against resistance from the respective resilient elements so that the thrust load is shared between the first and second thrust bearings.

According to another aspect, there is provided a method of determining the axial load on load-sharing thrust bearings, comprising the steps of: providing first and second thrust bearings, each including an inner race and an outer race which is supported by at least one resilient element; applying a test axial load to each of the first and second thrust bearings, to elastically deform the at least one resilient element so as to axially displace the outer race; determining the test axial displacement of each outer race in order to obtain calibration data comprising values of axial load versus axial displacement; applying an in-service axial load to the first and second thrust bearings to elastically deform the resilient elements so as to axially displace the respective outer races; measuring the in-service axial displacement of each outer race; and based on the measured in-service axial displacements, inferring from the calibration data the values of the in-service axial loads on the first and second thrust bearings.

Calibrating the thrust bearings, prior to in-service operation, enables determination of the individual operating loads on the bearings. This knowledge of the in-service loads can be useful for predicting maintenance schedules and diagnosing problems.

The step of applying a test axial load to each of the first and second thrust bearings, to elastically deform the at least one resilient element so as to axially displace the outer race, may be preceded by a step of: applying a relatively smaller test axial load, in order to axially displace the inner race to seat the thrust bearing.

The method may include the steps of: selecting a value, or a range of values, of in-service axial load at which sharing of the in-service axial load between the first and second thrust bearings is to commence; and inferring from the calibration data an axial separation distance, or a range of axial separation distances, between the first and second thrust bearings in order to achieve the said commencement of sharing of in-service axial load.

The steps of applying the test axial load and determining the test axial displacements may be carried out on a slave stand which is separate from the in-service environment. Or, these steps may be carried out in the in-service environment, for example in a gas turbine engine.

The steps of applying the in-service axial load and measuring the in-service axial displacements may be carried out in a gas turbine engine, the first and second thrust bearings being disposed on a shaft of the gas turbine engine and the in-service axial load being applied to the first and second thrust bearings by the shaft.

The in-service axial displacement may be measured by measurement devices which are disposed adjacent end faces of the first and second thrust bearings. The measurement devices may comprise eddy current, laser, optical, or linear variable differential transformer (LVDT), devices.

Embodiments of the invention will now be described by way of example, with reference to the accompanying figures in which:

FIGS. 8 and 9 show results of tests conducted on simulated bearing arrangements;

Figure 10:
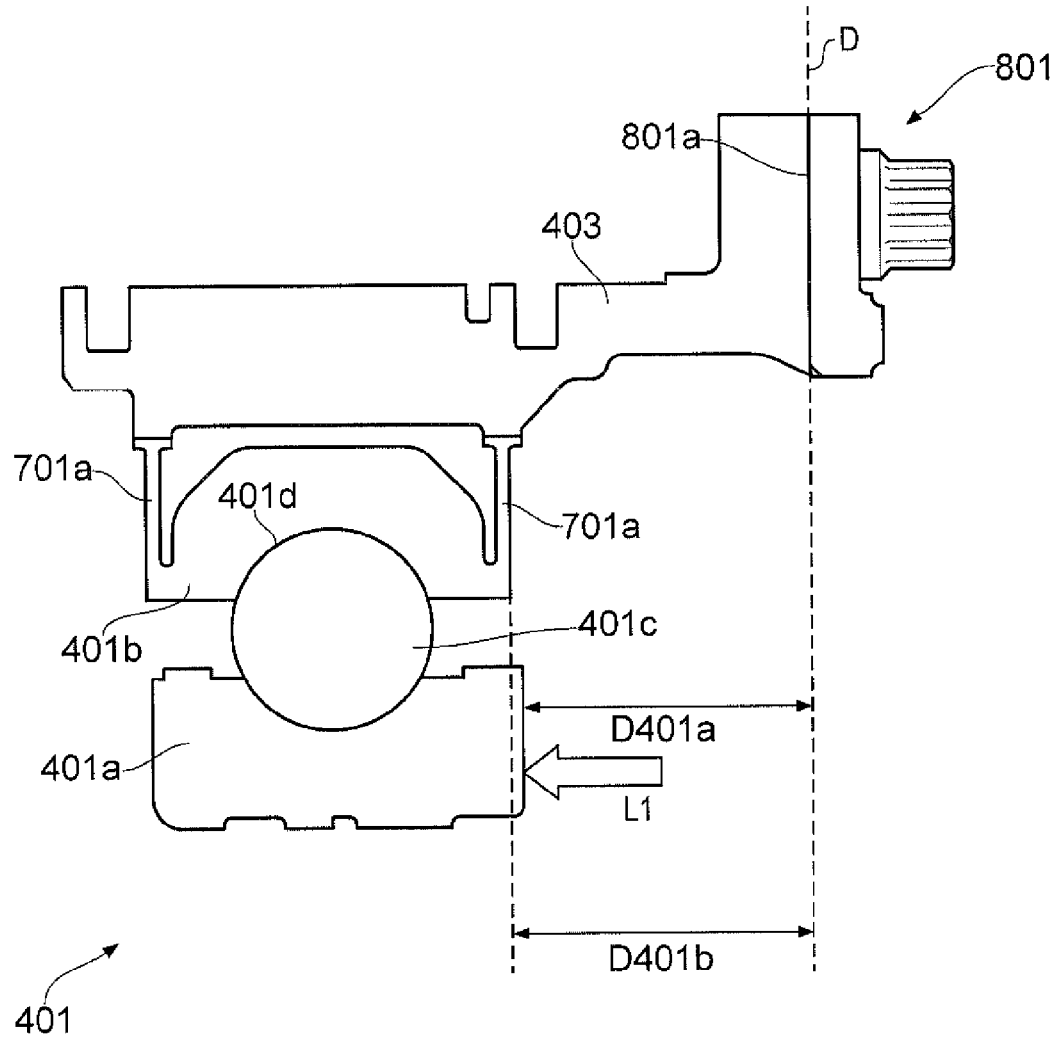
FIGS. 10 and 11 show two bearings individually mounted on a set-up jig.
Figure 11:
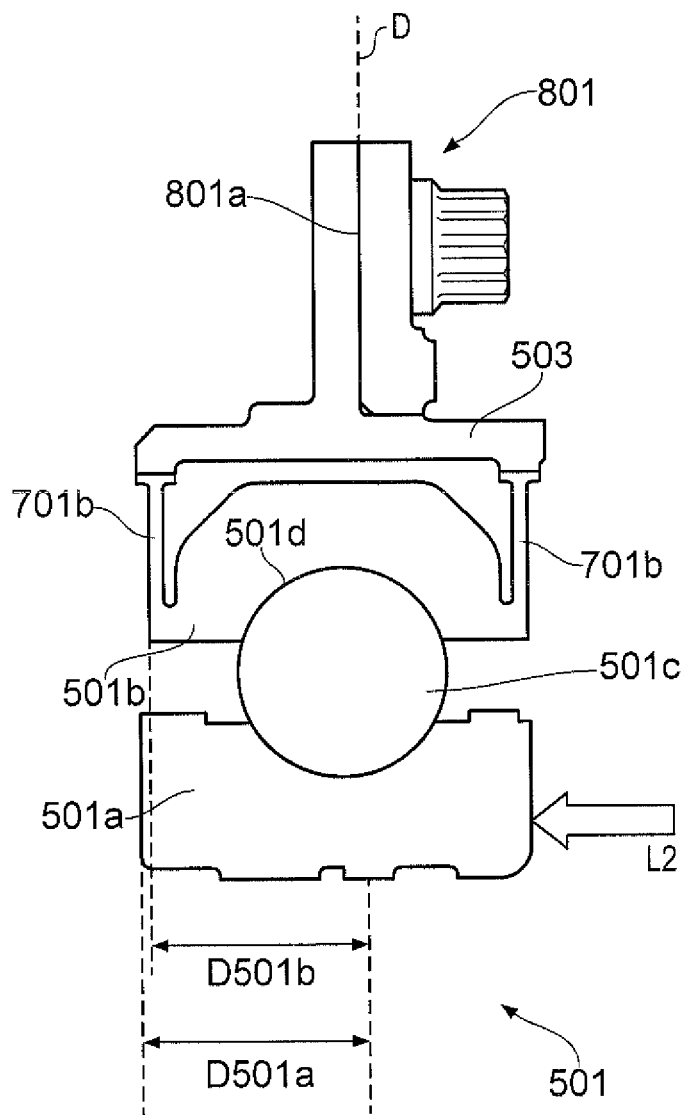
Figure 13:
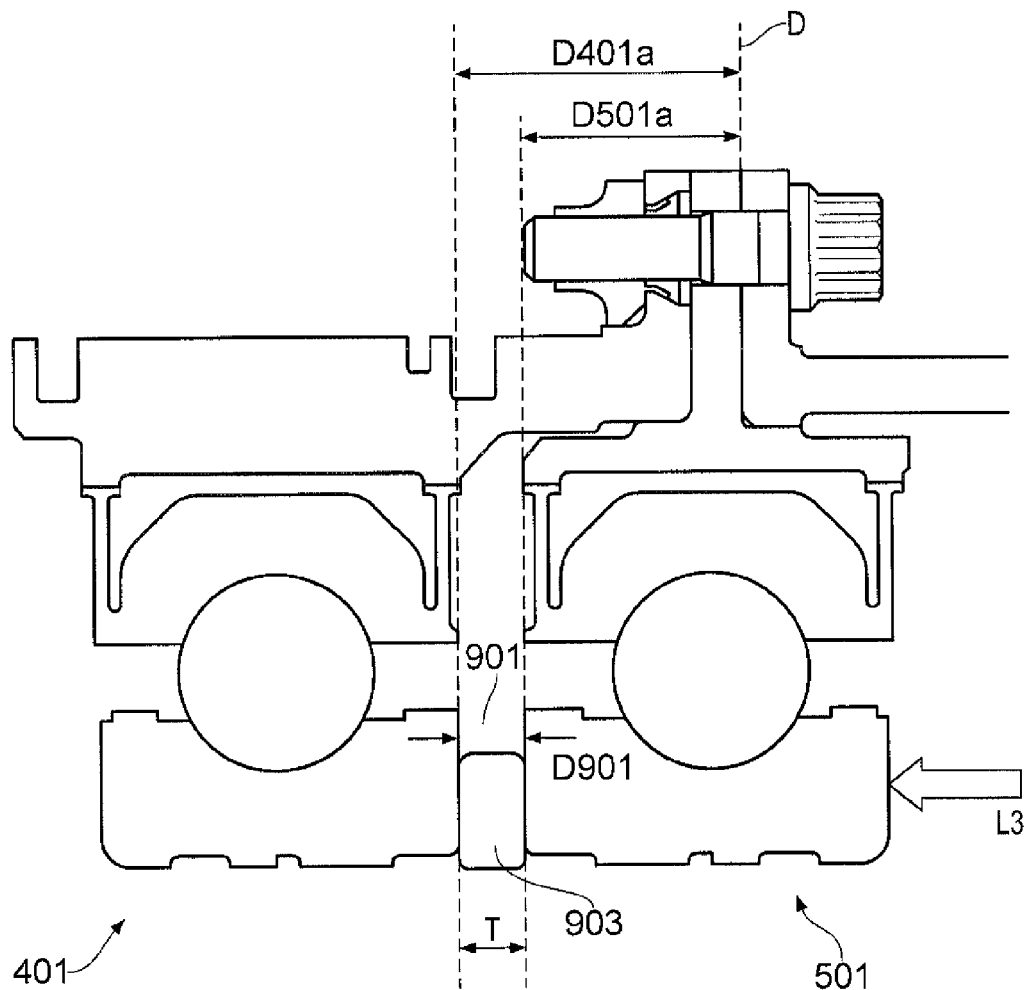
Figure 14:
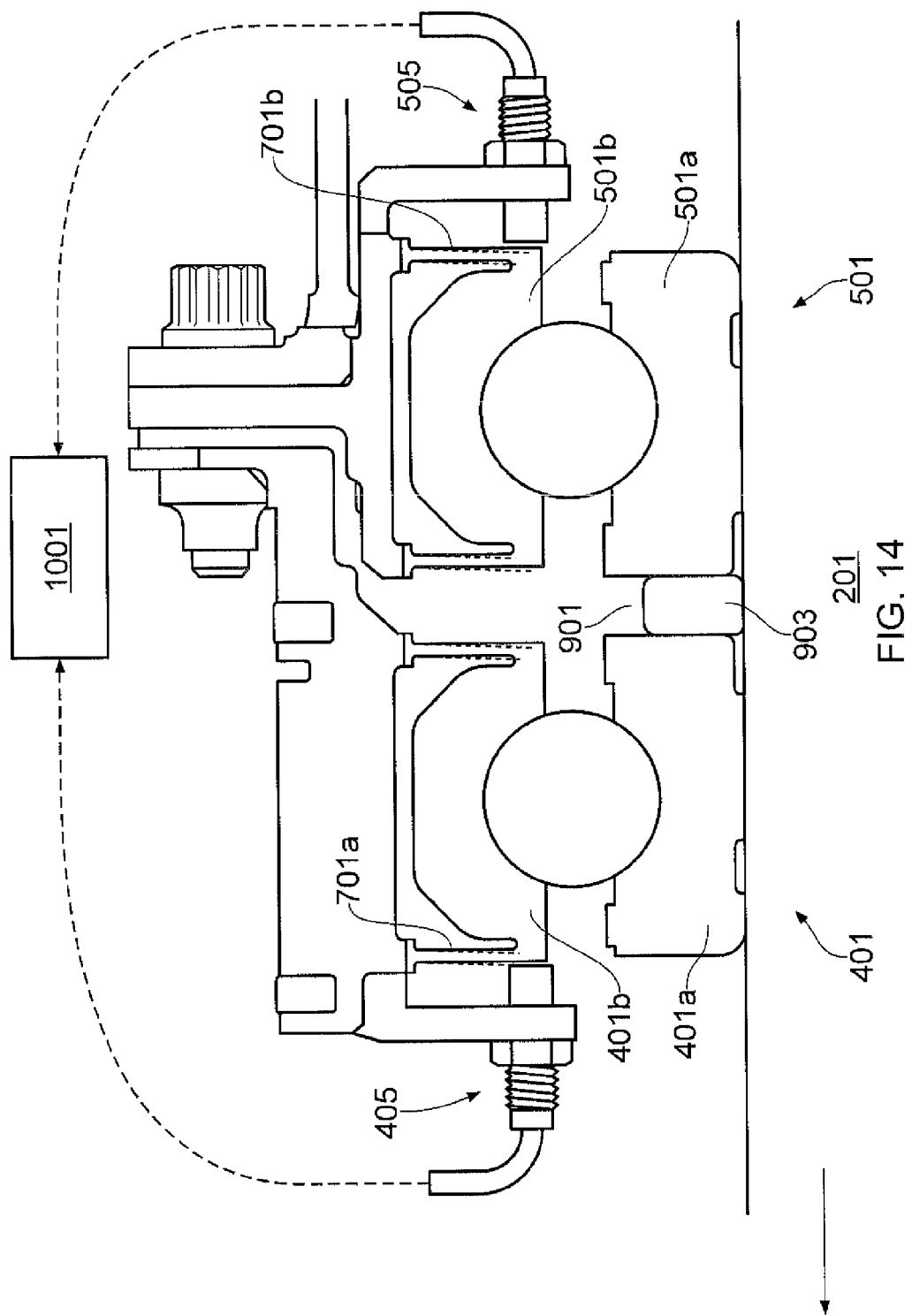

FIGS. 12a-d show plots of load versus displacement relating to the bearings of FIGS. 10 and 11;

FIG. 13 shows both the bearings of FIGS. 10 and 11 mounted on the set-up jig; and FIG. 14 shows the bearings of FIGS. 10 and 11 installed in a gas turbine engine.

Figure 1:
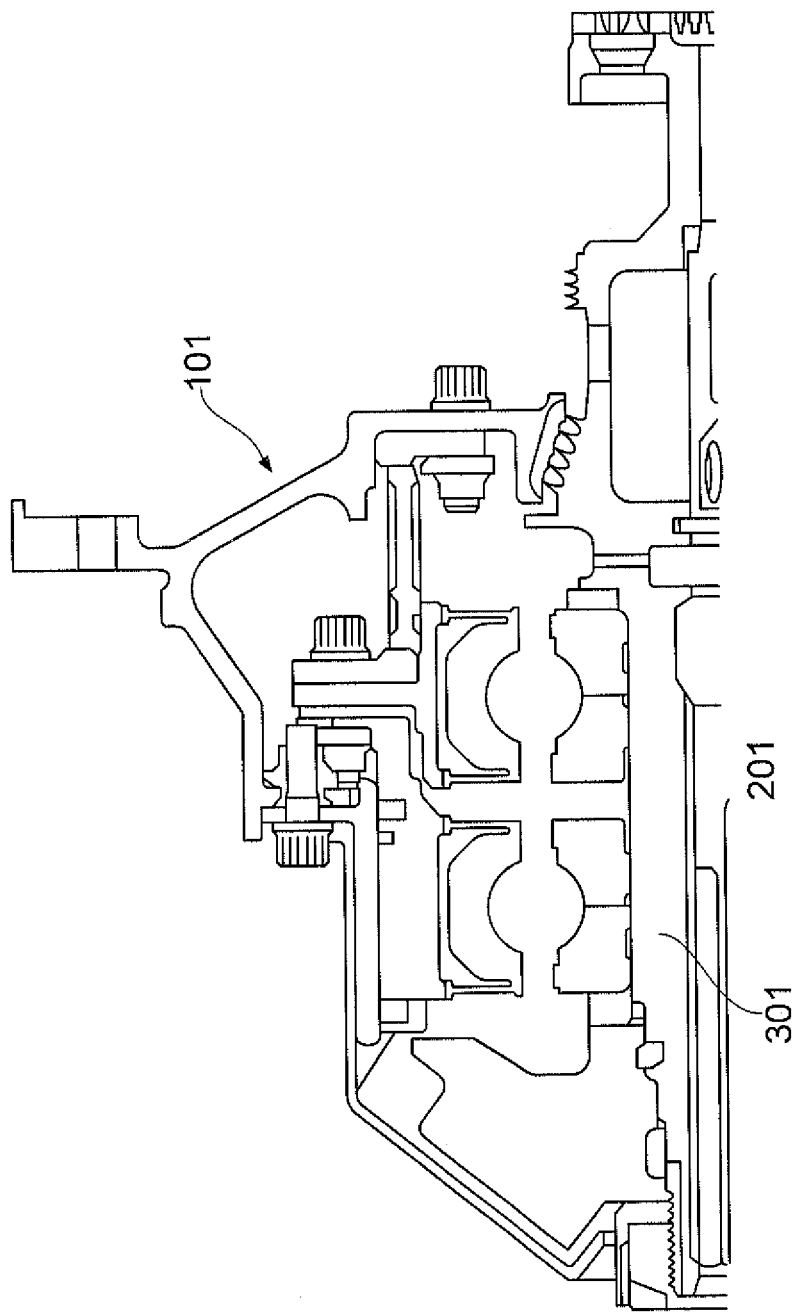
FIG. 1 is a schematic illustration of a bearing arrangement according to the invention, which is disposed in a bearing housing of a gas turbine engine.

FIG. 1 shows a half-section of a bearing housing 101 of a gas turbine engine. In this embodiment, the engine is a three-shaft gas turbine engine of an aircraft. A shaft 201 of the engine extends through the generally-annular bearing housing 101 and is supported by a location bearing arrangement 301. In this embodiment, the shaft connects a high pressure turbine and a high pressure compressor (not shown) of the engine.

Figure 2:
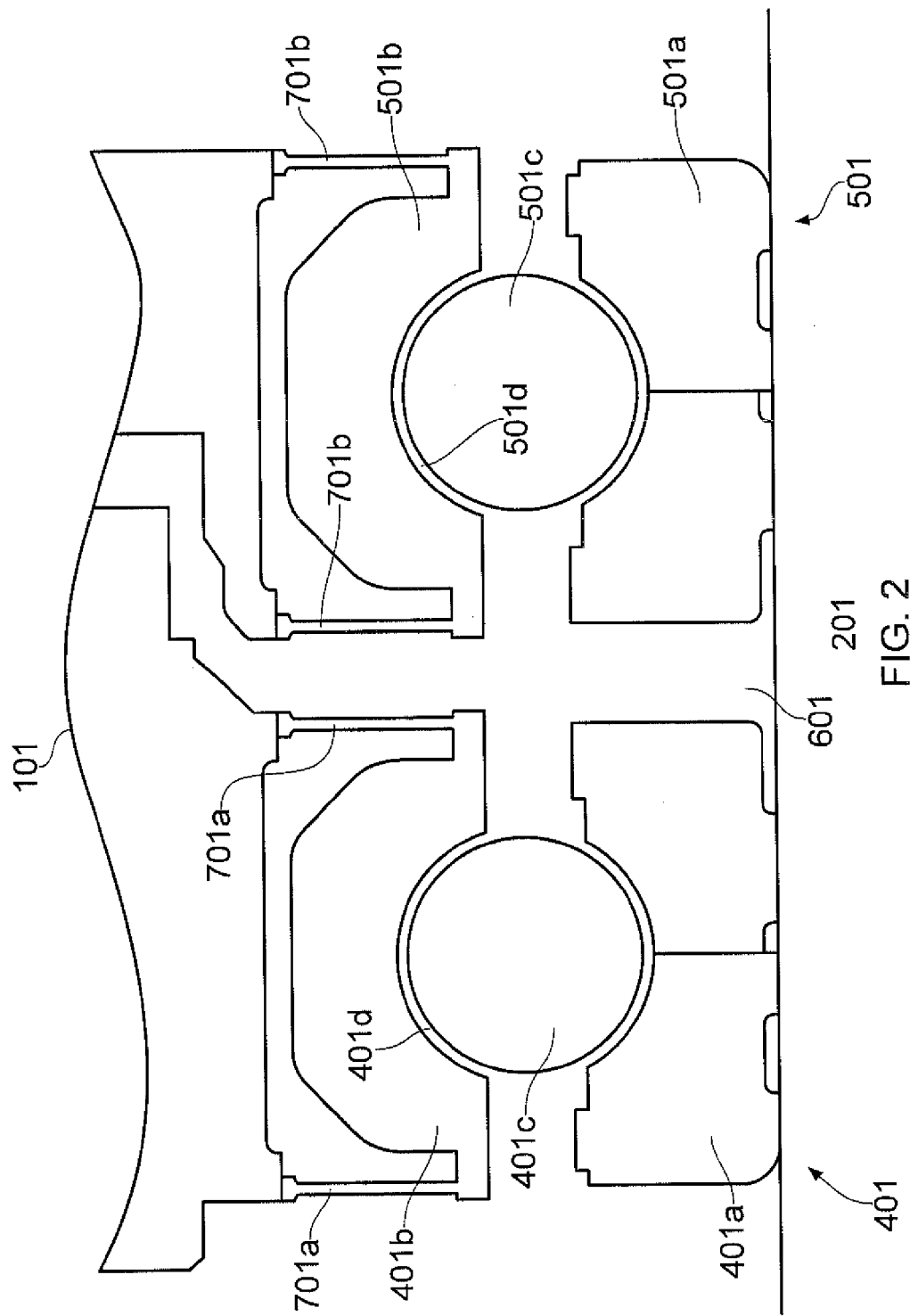
FIG. 2 shows an enlarged schematic view of the bearing arrangement of FIG. 1, in an unloaded condition.

Referring to FIG. 2, in this embodiment the location bearing arrangement 301 comprises first and second thrust bearings 401, 501, each of which includes an inner race 401a, 501a and an outer race 401b, 501b, between which a plurality of rolling elements 401c, 501c is disposed in a cage (not shown). In this embodiment, the rolling elements 401c, 501c are balls. In this embodiment, each of the first and second thrust bearings 401, 501 is a single-row bearing of the deep-groove type. In this embodiment, the inner races 401a, 501a and the outer races 401b, 501b comprise M50NiL steel and the rolling elements 401c, 501c comprise M50 steel.

In this embodiment, the inner races 401a, 501a of the first and second thrust bearings 401, 501 are mounted on the shaft 201 and are separated by an axial gap 601. In this embodiment, the axial gap 601 has an axial dimension of 5 mm.

The outer races 401b, 501b of the first and second thrust bearings 401, 501 are each supported by resilient elements, in this embodiment respective pairs of generally flat, radially-extending sheets, or diaphragms 701a, 701b, which are secured to the bearing housing 101. In this embodiment, the diaphragms 701a, 701b are constructed from stainless steel.

In each thrust bearing 401, 501 there exists a clearance gap 401d, 501d between the rolling elements 401c, 501c, and the inner race 401a, 501a and the outer race 401b, 501b. In an unloaded condition (as shown in FIG. 2) the clearance gaps 401d, 501d provide free "play" or axial float in the first and second thrust bearings 401, 501. In this embodiment, the axial clearance gap 401d in the first thrust bearing 401 has a maximum size of 1.00 mm and the axial clearance gap 501d in the second thrust bearing 501 has a maximum size of 1.01 mm. That is, there is a difference of 10 microns between the axial clearance gaps 401d, 501d, which is caused by geometrical variations (manufacturing tolerances) in the first and second thrust bearings 401, 501. It will be understood that in the Figures the size of the clearance gaps 401d, 501d has been exaggerated for the sake of clarity, particularly in the radial direction.

Figure 3:
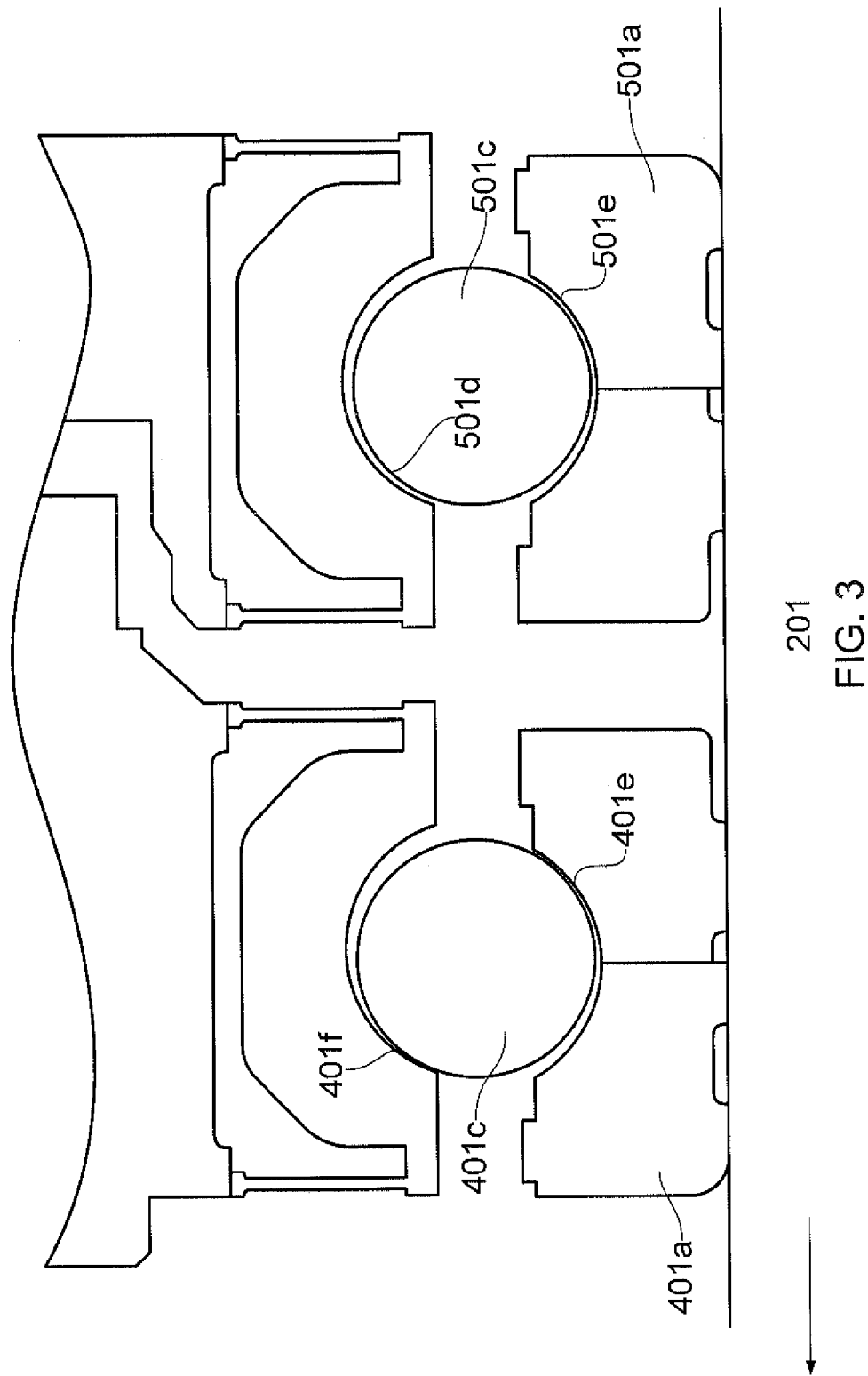
FIG. 3 shows the bearing arrangement of FIG. 2, in a part-loaded condition.

The operation of the location bearing arrangement 301 will now be described, at first with particular reference to FIG. 3. The shaft 201 is being driven by the high pressure turbine to rotate about its longitudinal axis. In addition, the shaft 201 is moving axially (from right to left as indicated by the arrow), relative to the static bearing housing 101, under a net aerodynamic force between the high pressure turbine and the high pressure compressor. As the shaft 201 slides axially the inner races 401a, 501a of the first and second thrust bearings 401, 501 (which are mounted to the shaft 201) come into contact with the respective rolling elements 401c, 501c at respective contact points 401e, 501e. As the shaft 201 continues to slide, in the first thrust bearing 401 the rolling elements 401c come into contact with the outer race 401b at contact points 401f. Thus, an axial thrust load F is exerted on, and transmitted through, the first thrust bearing 401 by the shaft 201. Due to the aforementioned difference in the size of the clearance gaps 401d, 501d in the first and second thrust bearings 401, 501, the clearance gap 501d of the second thrust bearing 501 is not yet closed but is reduced in size (to 10 microns).

Figure 4:
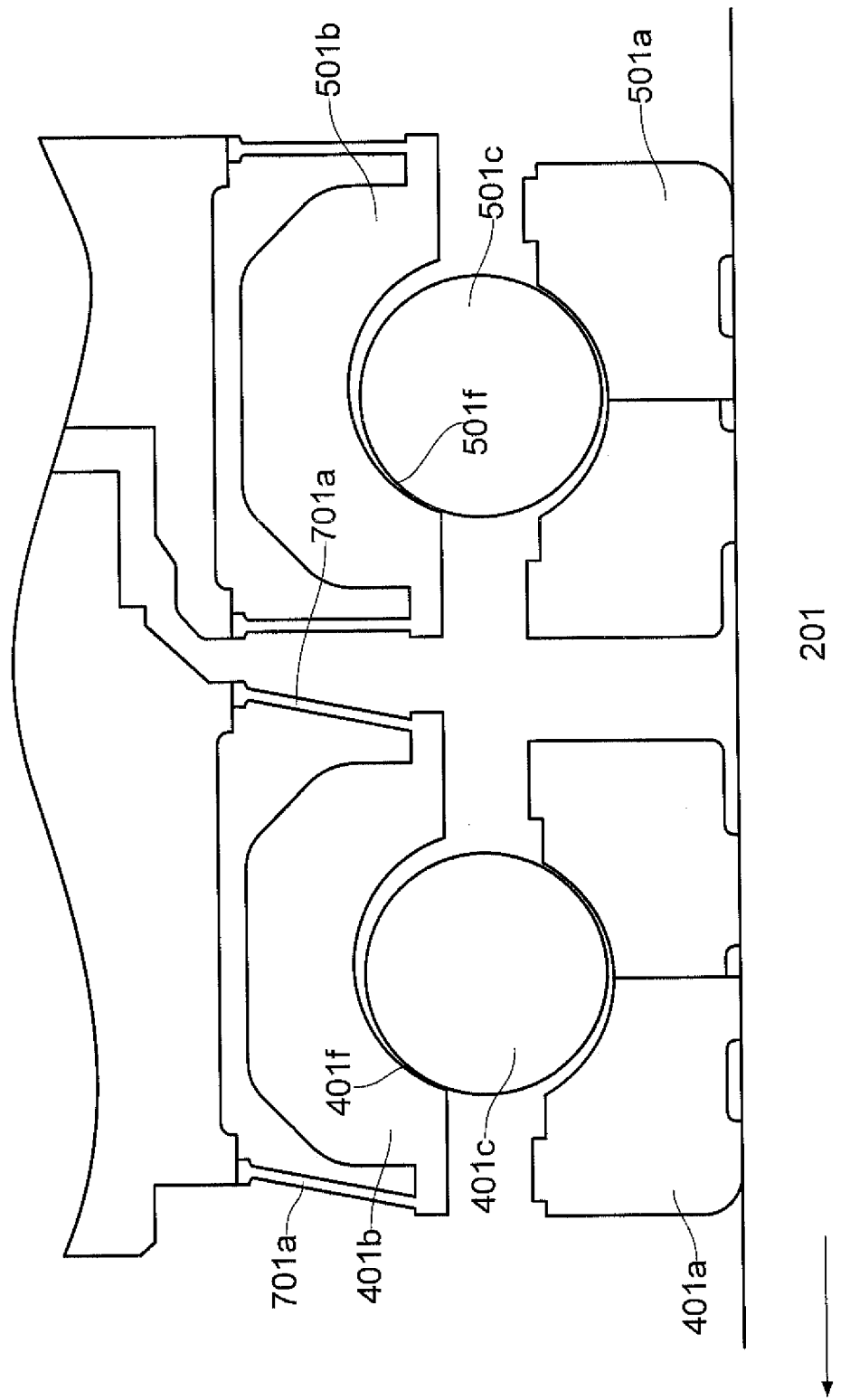
FIGS. 4 and 5 show the bearing arrangement of FIG. 2, in a loaded condition.

Referring now to FIG. 4, at a certain magnitude the force exerted at the contact points 401f, by the rolling elements 401c on the outer race 401b of the first thrust bearing 401, is sufficient to overcome the resistance (stiffness) of the diaphragms 701a which support the first thrust bearing 401. Thus the diaphragms 701a begin to elastically deform (bend or deflect) and the outer race 401b of the first thrust bearing 401 is axially displaced along with the moving shaft 201 (leftwards as shown in FIG. 4).

At the same time, the (10 micron) clearance gap 501d in the second thrust bearing 501 is closed as the rolling elements 501c of the second thrust bearing 501 are brought into contact with the respective outer race 501b at contact points 501f. Thus, the deformation of the diaphragms 701a, which support the first thrust bearing 401, enables the second thrust bearing 501 to take up a share of the axial thrust load F imposed by the shaft 201. In this condition, the second thrust bearing 501 may be sufficiently loaded that skidding of the rolling elements 501c may be prevented.

Figure 5:
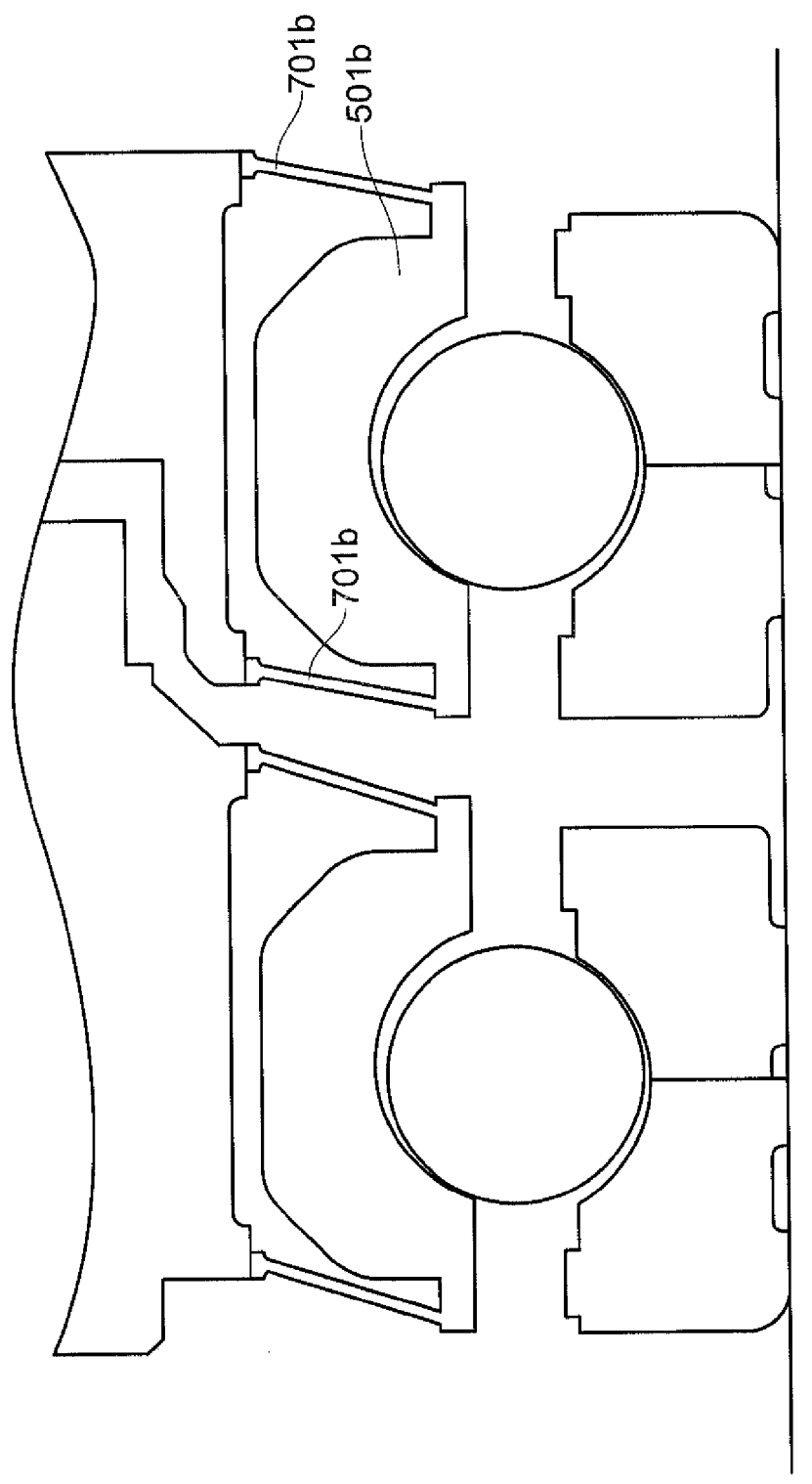

Referring now to FIG. 5, as the shaft 201 continues to slide (leftwards) the axial thrust load F further overcomes the resistance (stiffness) of the diaphragms 701b which support the second thrust bearing 501, causing these diaphragms 701b to begin to elastically deform (bend or deflect) and the outer race 501b of the second thrust bearing 501 to be axially displaced along with the shaft 201 (also leftwards as shown in FIG. 5). As the magnitude of the axial thrust load F is increased, the load is progressively shared between the first and second thrust bearings 401, 501 until the thrust bearings 401, 501 carry an equal, or near-equal, share of the axial thrust load F.

The ability of the diaphragms 701a, 701b to distribute the axial thrust load F between the first and second thrust bearings 401, 501 means that relatively large geometrical variations and/or differential expansions between the thrust bearings 401, 501 may be tolerated. For example, as will be discussed further herein below, it has been found that the load sharing bearing arrangement 301 can accommodate differences in the thrust bearings 401, 501 of about 40 microns.

It will, of course, be understood that the bearing arrangement 301 will behave in the same way if the axial thrust load F is applied in the opposite direction to that described herein above, i.e. from left to right in FIGS. 3 to 5.

In the absence of a thrust load from the shaft 201 (as depicted in FIG. 2), the diaphragms 701a, 701b (resilient elements) are in a neutral or unbiased condition. In operation (FIGS. 4 and 5), the resistance offered by the diaphragms 701a, 701b when in the deformed or biased condition ensures that the respective first and second thrust bearings 401, 501 remain loaded without skidding of the respective rolling elements 401c, 501c. Since the deformation of the diaphragms 701a, 701b is elastic, the energy stored therein is available to return the diaphragms 701a, 701b toward, and eventually to, their original (neutral) positions when the axial thrust load F is reduced, and eventually removed, as the shaft 201 reverses its direction of travel (rightwards in FIGS. 3 to 5).

The thickness of the sheet-like diaphragms 701a, 701b is selected such that they will be flexible enough to provide the required amount of deflection or bending while having sufficient strength to take the sectional shear and bending stresses imposed during deformation, and also to ensure that radial loads from the shaft 201 do not cause twisting moments. In some embodiments the thickness of the resilient elements is constant, while in other embodiments the thickness is varied. In the exemplary embodiment described herein above, each diaphragm 701a, 701b has a constant thickness of 1.219 mm and a constant radial dimension (height) of 10.0 mm.

While the schematic depictions in FIGS. 4 and 5 show the diaphragms 701a, 701b being deformed only at their ends, it will be understood that deformation may occur across the faces of the diaphragms 701c-d, for example such as to present a generally curved or 'S' shaped radial section.

Although the bearing arrangement 301 described herein above comprises two diaphragms 701a, 701b supporting each of the first and second thrust bearings 401, 501, it will be understood that other embodiments may comprise any number of supporting resilient elements. For example, one resilient element per thrust bearing 401, 501 may be sufficient to enable load sharing between the thrust bearings 401, 501. In this case, the resilient elements may support axially-central portions of the respective outer races 401b, 501b of the first and second thrust bearings 401, 501.

Figure 6:
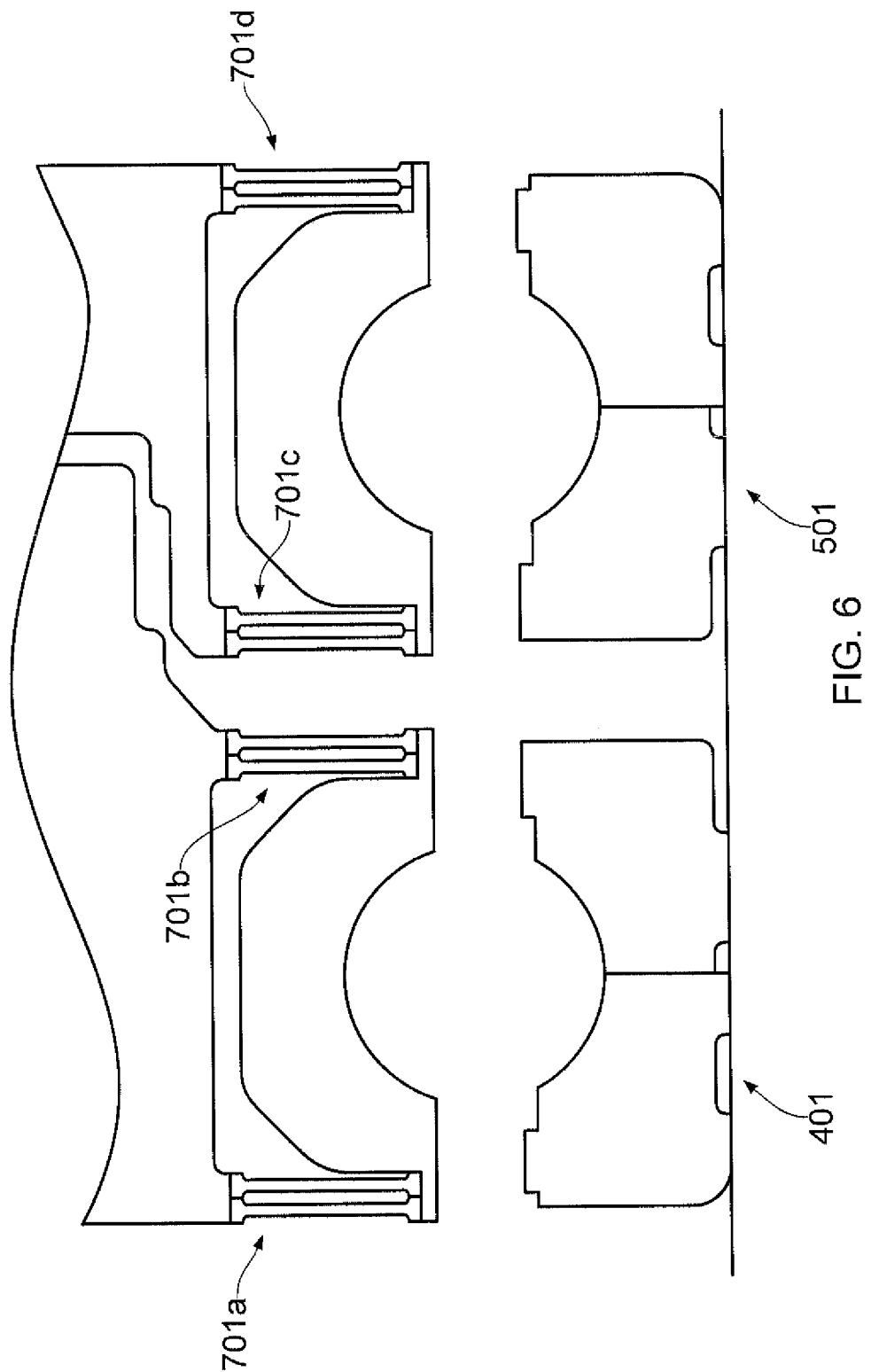
FIGS. 6 and 7 show alternative embodiments of the bearing arrangement.

Alternatively, each of the first and second thrust bearings 401, 501 may be supported by more than two resilient elements. Furthermore the resilient elements may be arranged in pairs or groups. For example, an embodiment shown in FIG. 6 comprises four diaphragms 701a-d per thrust bearing 401, 501, which arrangement reduces both the stiffness and shear stress without increasing the bending stress, compared to a two-diaphragm-per-bearing configuration.

The table below illustrates the effects of altering the number of supporting diaphragms.

| Multi-Diaphragm Comparison | | | | | | |
|---|---|---|---|---|---|---|
| No. of diaphragms (per thrust bearing) | | | | | | |
| | 1 | 2 | 4 | 6 | 8 | 10 | 12 |
| Shear stress MPa | 45.1 | 31.9 | 22.6 | 18.4 | 15.9 | 14.3 | 13.0 |
| Stiffness mm/MN | 1.37 | 1.94 | 2.74 | 3.35 | 3.86 | 4.33 | 4.76 |
| Thickness mm | 1.725 | 1.219 | 0.862 | 0.704 | 0.61 | 0.545 | 0.497 |
| Total thickness mm | 1.725 | 2.44 | 3.45 | 4.22 | 4.88 | 5.45 | 5.96 |
| Relative stiffness | 1.0 | 1.4 | 2.0 | 2.4 | 2.8 | 3.2 | 3.5 |

In an embodiment, one or more of the diaphragms include holes which extend around the circumference of the diaphragm. The holes may optimise stress and deflection and/or enable fluid flows over the outer races 401b, 501b of the thrust bearings 401, 501.

In an embodiment, the resilient elements, which support the first and second thrust bearings 401, 501, comprise beams or radial fingers. Compared to diaphragms, radial fingers may provide greater flexibility, albeit with higher stress (for a given thickness) because the radial fingers do not transmit any hoop loads.

In an embodiment, the resilient elements (e.g. diaphragms or radial fingers) are angularly offset from the perpendicular such as to have an axial component as well as a radial component. In other words, the resilient elements may be slanted or inclined from an imaginary line which extends perpendicular to the longitudinal axis of the shaft 201. For example, the resilient elements may form a tapered or conical shape. Such configurations may provide relatively high stiffness (resilience) with a small radial dimension, giving a particularly compact arrangement.

In an embodiment, the resilient elements are curved or dished, such as to comprise a non-linear radial section. In this way the progression of the elastic deformation under load may be controlled, for example to be non-linear.

In an embodiment, the resilient elements (e.g. diaphragms or radial fingers) are constructed from a titanium alloy. Alternatively, the resilient elements comprise a nickel alloy, or a ceramic. Or, the resilient elements may be constructed from a super elastic material or alloy, i.e. a material which may undergo an elastic (reversible) response to an applied stress, caused by a phase transformation between the austenitic and martensitic phases of a crystal. Some properties of suitable construction materials are given in the table below. As can be seen, super elastic materials have a very high strength-to-elasticity ratio and may deform to a greater extent before exceeding allowable stresses.

|  |  | Mild steel | Stainless steel | Alloy steel | Titanium alloy | Super elastic |
|---|---|---|---|---|---|---|
| Ultimate Tensile Strength (UTS) | MPa | 300 | 500 | 1000 | 950 | 800 |
| Young's Modulus (E) | GPa | 200 | 200 | 200 | 115 | 45 |
| UTS/E | ×10$^3$ | 1.5 | 2.5 | 5 | 8 | 18 |

In an embodiment, the overall stiffness of the resilient elements (e.g. diaphragms or radial fingers) differs between the first and second thrust bearings 401, 501. For example, in the embodiment described herein above, the diaphragms 701a which support the first thrust bearing 401 are of different thickness and/or material compared with the diaphragms 701b which support the second thrust bearing 501. Furthermore, in an embodiment the diaphragms 701a, 701b supporting any one thrust bearing 401, 501 may be of different thickness and/or material compared to one another. These differences may enable better control of the load sharing between the first and second thrust bearings 401, 501.

There is no particular limit to the axial spacing between the first and second thrust bearings 401, 501, other than with regard to practical tolerances and thermal expansion which will increase with distance. For example, in some embodiments the axial gap 601 has an axial dimension of anything up to about 25 mm, while in other embodiments the axial dimension exceeds 25 mm.

Figure 7:
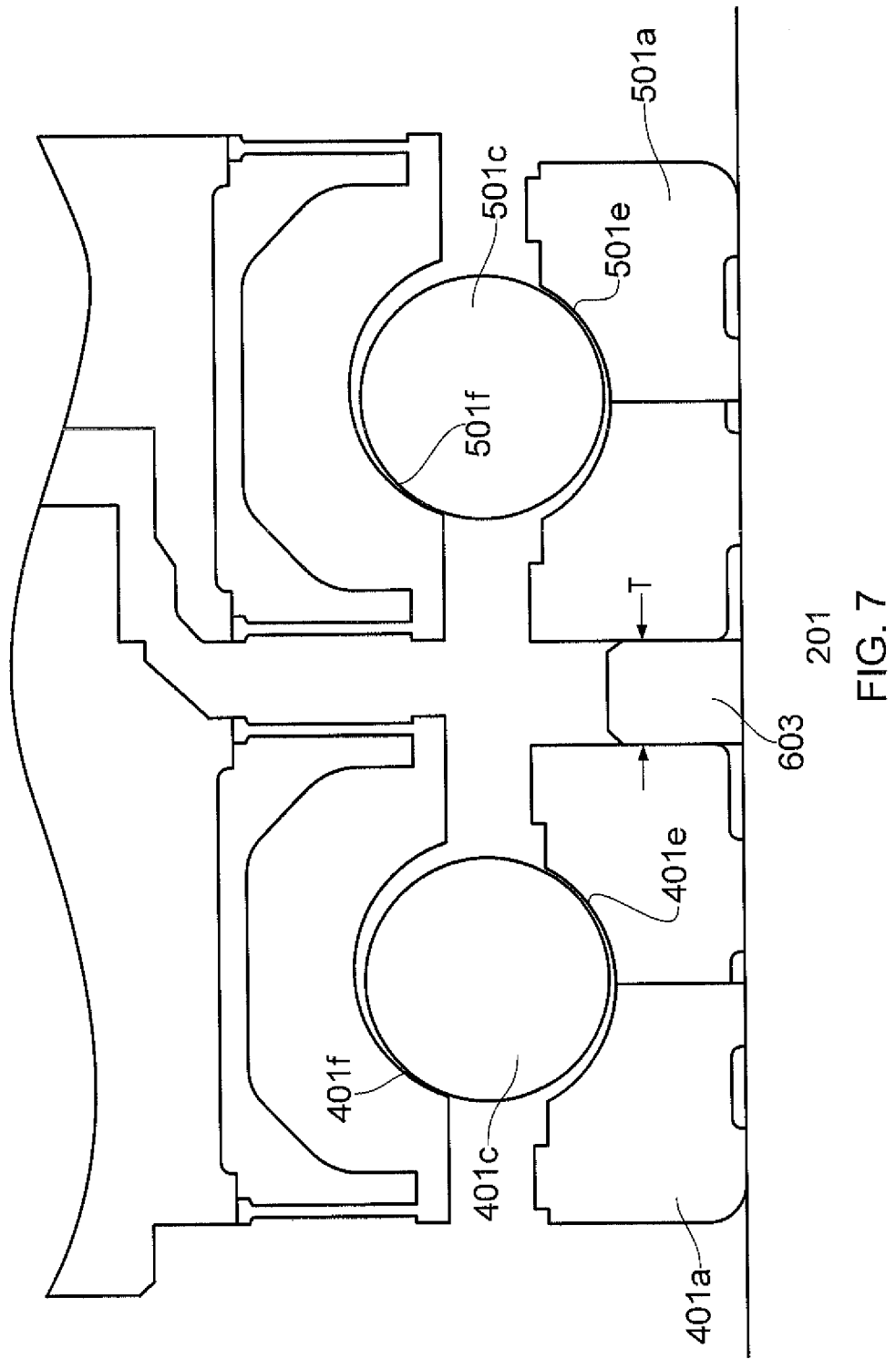

In an embodiment shown in FIG. 7, an optional spacer 603 is disposed in the axial gap 601 between the inner races 401a, 501a of the first and second thrust bearings 401, 501. In this embodiment, the spacer 603 is fitted during assembly of the bearing arrangement 301, after installation on the shaft 201 of the inner race 401a of the first thrust bearing 401 and prior to installation on the shaft 201 of the inner race 501a of the second thrust bearing 501. The thickness T of the spacer 603 is selected to be sufficient to bring the rolling elements 401c, 501c of each of the first and second thrust bearings 401, 501 into engagement with the respective inner races 401a, 501a at contact points 401e, 501e and the respective outer races 401b, 501b at contact points 401f, 501f. That is, the spacer 603 ensures the closure (or at least part-closure) of the clearance gaps 401d, 501d to take up the free play or axial float in the first and second thrust bearings 401, 501, prior to the application of a significant thrust load from the shaft 201 during engine operation. In this way, the likelihood of skidding of unloaded (or lightly loaded) thrust bearings 401, 501 may be reduced.

Where one of the first and second thrust bearings 401, 501 is more flexible than the other, for instance due to small manufacturing differences between the diaphragms 701a, 701b, the more flexible thrust bearing 401, 501 may be arranged to engage first to give better load sharing over the operating range.

In an embodiment, the resilient elements and the upper races 401b, 501b are of unitary construction.

In an embodiment, the inner races 401a, 501a are made integral with the shaft 201, for example machined on the shaft 201.

While the bearing arrangement 301 described herein above comprises ball-type roller bearings, it will be understood that the invention is generally applicable to all types of bearings which take a thrust load. For example, roller bearings comprising inclined or tapered cylindrical rolling elements, and hydrostatic or hydrodynamic thrust bearings. Furthermore, it will be understood that the invention is not limited to embodiments comprising two thrust bearings but may comprise any number of thrust bearings, for example three or four thrust bearings.

The present inventors constructed a rig for testing a thrust bearing arrangement which was representative of the embodiments described herein above. The rig was configured to accommodate a spacer on a shaft between first and second thrust bearings and a range of spacers of different thickness were used to simulate geometrical variations (manufacturing and operational differences) between the two thrust bearings to determine the effect on load sharing.

Figure 9:
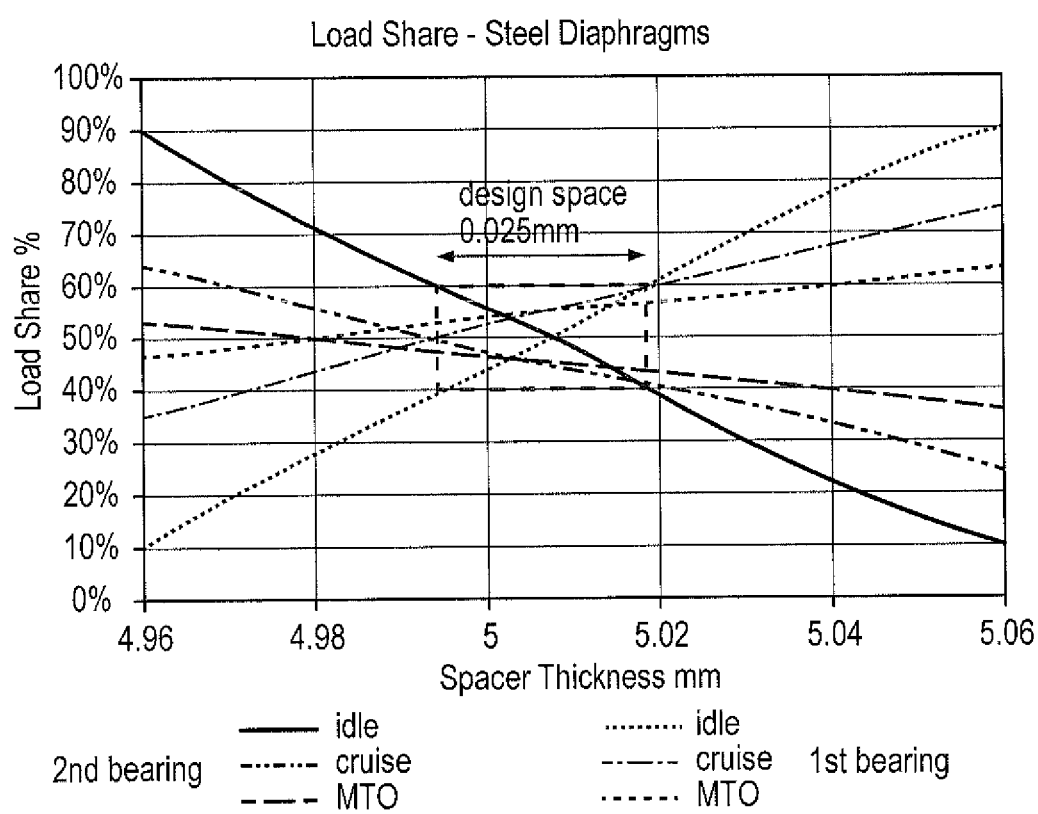

FIGS. 8 and 9 contain representative results of rig tests conducted using steel diaphragms as the supporting resilient elements. FIG. 8 shows the effect of different spacer thickness on the load share, effectively equating to manufacturing and operation variances of +/−0.05 mm from the optimum. FIG. 9 shows the load share achieved at three operating conditions (idle, cruise, take off) for a representative aircraft engine, demonstrating a tolerance band ("design space") of 0.025 mm whilst remaining within a 60:40 load share at all conditions. Subsequent testing has indicated that a 0.04 mm design space can be achieved with single flexible elements per thrust bearing and may be improved further with multiple flexible elements per thrust bearing.

The axial displacement of the first and second thrust bearings 401, 501 which is allowed by the deformation of the resilient elements (e.g. diaphragms or radial fingers) further provides for the determination of the individual and total axial loads on the bearings 401, 501, as will now be described.

FIG. 10 shows a first thrust bearing 401 including an inner race 401a and an outer race 401b, between which a plurality of rolling elements 401c is disposed in a cage (not shown) with an axial clearance gap 401d between the rolling elements 401c and the inner and outer races 401a, 401b. In this embodiment, the rolling elements 401c are balls. In this embodiment, the first thrust bearing 401 is a single-row bearing of the deep-groove type. In this embodiment, the inner race 401a and the outer race 401b comprise M50NiL steel and the rolling elements 401c comprise M50 steel.

A generally-annular bearing carrier 403 of the first thrust bearing 401 is here mounted to a support face 801a of a set-up jig, or slave stand 801. In this embodiment, the support face 801a provides a common datum point D, as will be further discussed herein below. The outer race 401b of the first thrust bearing 401 is supported on the bearing carrier 403 by resilient elements, in this embodiment a pair of generally flat, radially-extending sheets, or diaphragms 701a, which are secured to the bearing carrier 403 at their radial peripheries. In this embodiment, the diaphragms 701a are constructed from stainless steel.

In this embodiment, the first thrust bearing 401 is arranged on the slave stand 801 in an axially horizontal configuration, in order to prevent its own weight causing load maldistribution, high local loads, and friction. Optionally, the first thrust bearing 401 is also disposed on a dummy shaft (not shown) of the slave stand 801.

With the first thrust bearing 401 set up on the slave stand 801 as described, a small axial load L1 is applied to the inner race 401a (in this case from right to left as indicated by the arrow in FIG. 10) in order to seat the first thrust bearing 401. That is, the applied load causes the inner race 401a to move axially, relative to both the slave stand 801 and the outer race 401b, so as to close the axial clearance gap 401d between the rolling elements 401c and the inner and outer races 401a, 401b and remove any free "play" or axial float from the first thrust bearing 401. Optionally, the inner race 401a may be rotated to assist in seating the first thrust bearing 401.

Once the first thrust bearing 401 has been seated, the respective axial distances D401a, D401b of end faces of the inner race 401a and the outer race 401b, from the common datum point D, are measured and recorded.

The axial load L1 is then gradually increased, in order to simulate a thrust load on the first thrust bearing 401. At a certain magnitude the force exerted, by the rolling elements 401c on the outer race 401b, is sufficient to overcome the resistance (stiffness) of the diaphragms 701a which support the first thrust bearing 401. Thus the diaphragms 701a begin to elastically deform (bend or deflect) and the outer race 401b is axially displaced (not shown in FIG. 10) along with the inner race 401a, the axial displacements becoming greater as the axial load L1 is progressively increased.

As the axial load L1 is increased, the axial distances D401a, D401b of the respective end faces of the inner and outer races 401a, 401b, from the common datum point D, are measured and recorded. From these measurements, the respective axial displacements d401a, d401b (not shown) of the inner and outer races 401a, 401b are calculated and recorded at selected values of axial load L1. In this way, a record is provided of a range of axial forces and the axial displacements d401a, d401b of the inner and outer races 401a, 401b which correspond to those forces.

In this embodiment, once the measurements have been recorded, the first thrust bearing 401 and its bearing carrier 403 are removed from the slave stand 801.

Turning now to FIG. 11, there is shown a second thrust bearing 501 which is of a similar type to the first thrust bearing 401. Thus the second thrust bearing 501 includes an inner race 501a and an outer race 501b, between which a plurality of rolling elements 501c is disposed in a cage (not shown) with an axial clearance gap 501d between the rolling elements 501c and the inner and outer races 501a, 501b. In this embodiment, the rolling elements 501c are balls. In this embodiment, the second thrust bearing 501 is a single-row bearing of the deep-groove type. In this embodiment, the inner race 501a and the outer race 501b comprise M50NiL steel and the rolling elements 501c comprise M50 steel.

In this embodiment, the second thrust bearing 501 is arranged on the same slave stand 801 as has been described herein above. That is, a generally-annular bearing carrier 503 of the second thrust bearing 501 is mounted to the support face 801a (providing common datum point D) of the slave stand 801. The outer race 501b of the second thrust bearing 501 is supported on the bearing carrier 503 by resilient elements, in this embodiment a pair of generally flat, radially-extending sheets, or diaphragms 701b, which are secured to the bearing carrier 503 at their radial peripheries. In this embodiment, the diaphragms 701b are constructed from stainless steel. In this embodiment, the diaphragms 701b are generally similar to the diaphragms 701a which support the first thrust bearing 401 as described herein above.

In this embodiment, the second thrust bearing 501 is arranged on the slave stand 801 in an axially horizontal configuration, in order to prevent its own weight causing load maldistribution, high local loads, and friction. Optionally, the second thrust bearing 501 is also disposed on a dummy shaft (not shown) of the slave stand 801.

With the second thrust bearing 501 set up on the slave stand 801 as described, a small axial load L2 is applied to the inner race 501a (in this case from right to left as indicated by the arrow in FIG. 11) in order to seat the second thrust bearing 501. That is, the applied load causes the inner race 501a to move axially, relative to both the slave stand 801 and the outer race 501b, so as to close the axial clearance gap 501d between the rolling elements 501c and the inner and outer races 501a, 501b and remove any free "play" or axial float from the second thrust bearing 501. Optionally, the inner race 501a may be rotated to assist in seating the second thrust bearing 501.

Once the second thrust bearing 501 has been seated, the axial distances D501a, D501b of end faces of the inner race 501a and the outer race 501b, from the common datum point D, are measured and recorded.

The axial load L2 is then gradually increased, in order to simulate a thrust load on the second thrust bearing 501. At a certain magnitude the force exerted, by the rolling elements 501c on the outer race 501b, is sufficient to overcome the resistance (stiffness) of the diaphragms 701b which support the second thrust bearing 501. Thus the diaphragms 701b begin to elastically deform (bend or deflect) and the outer race 501b is axially displaced (not shown in FIG. 11) along with the inner race 501a, the axial displacements becoming greater as the axial load L2 is progressively increased.

As the axial load L2 is increased, the axial distances D501a, D501b of the respective end faces of the inner and outer races 501a, 501b, from the common datum point D, are measured and recorded. From these measurements, the respective axial displacements d501a, d501b (not shown) of the inner and outer races 501a, 501b are calculated and recorded at selected values of axial load L2. In this way, a record is provided of a range of axial forces and the axial displacements d501a, d501b of the inner and outer races 501a, 501b which correspond to those forces.

In this embodiment, once the measurements have been recorded, the second thrust bearing 501 and its bearing carrier 503 remain mounted on the slave stand 801.

In the embodiment described herein above, each of the recorded displacements d401a, d401b, d501a, d501b represents the average of numerous measurements taken at a plurality of locations around the circumferences of the respective end faces of each of the inner and outer races 401a, 401b, 501a, 501b. Measurement is by conventional means, for example using a displacement probe. The recorded measurements provide data sets, which may be in the form of graphs showing load versus displacement, or look-up tables, or some other convenient format as will be apparent to the skilled reader. The data sets may be digitised and stored in a computer or on a computer-readable medium.

In this exemplary embodiment, the maximum value of the axial loads L1, L2 applied in the slave stand 801 is 65 kN, which value corresponds to a typical design load of the first and second bearings 401, 501. Furthermore, the lesser axial loads L1, L2 which are applied to seat the respective first and second bearings 401, 501 here take a value of about 650 N, i.e. one percent of the 65 kN design load. Of course, it will be understood that one-per-cent-of-design-load is only a rough rule of thumb, and some other value of axial load may be required in order to seat the first and second bearings 401, 501.

Figure 12B:
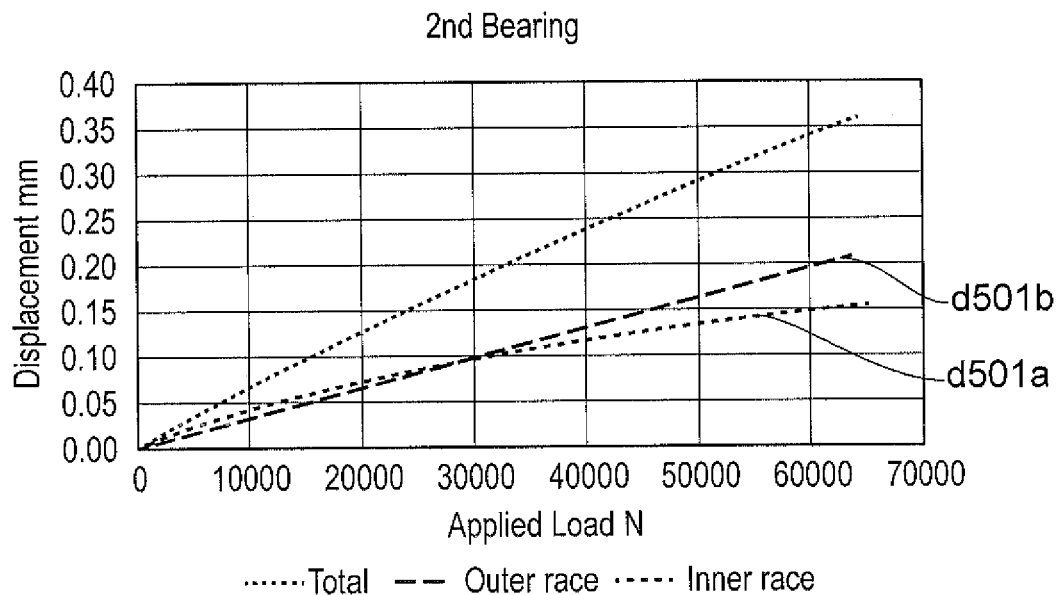
Figure 12A:
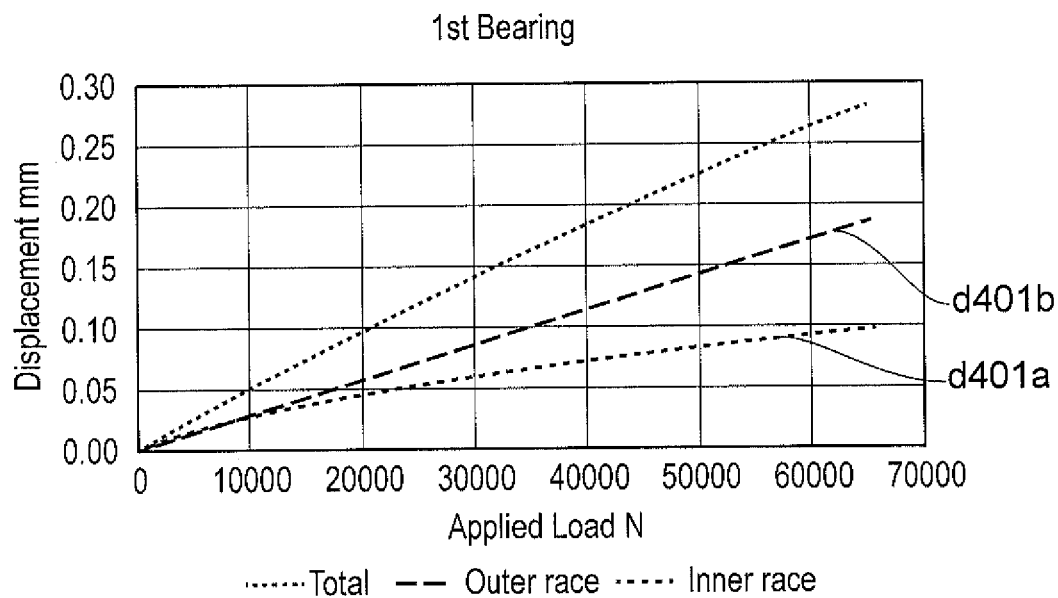

FIGS. 12a and 12b are load-versus-displacement plots relating to the above-described first and second bearings

401, 501. The graphs show the axial displacements d401a, d401b, d501a, d501b of the respective inner and outer races 401a, 401b, 501a, 501b, as well as the total displacement (summation of the displacements d401a, d401b, d501a, d501b of the respective inner and outer races 401a, 401b, 501a, 501b), of each of the thrust bearings 401, 501 on the slave stand 801.

Figure 12C:
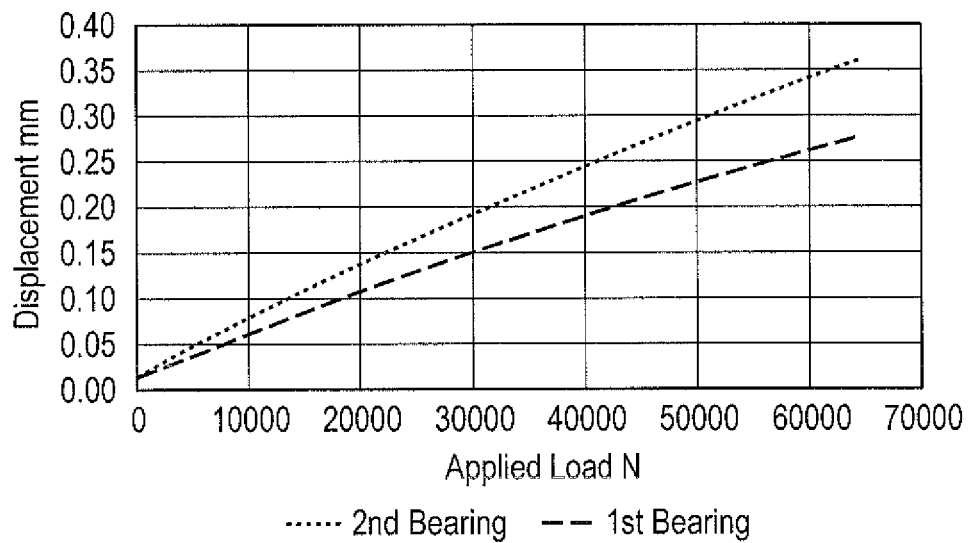

FIG. 12c is a load-versus-displacement plot which shows the total displacement of the first and second thrust bearings 401, 501. For the sake of clarity, the low load range of FIG. 12c is shown in higher-resolution in FIG. 12d. The plots of FIGS. 12c and 12d in particular may be used as "calibration curves" for determining the in-service axial loads on the first and second thrust bearings 401, 501, as will be described herein below.

As can be seen from FIGS. 12a-d, in this exemplary embodiment the total axial displacement of the second thrust bearing 501 is greater than the total axial displacement of the first thrust bearing 401 at any given axial load. Hence it is seen that the first thrust bearing 401 is stiffer (less flexible) than the second thrust bearing 501. This difference in stiffness is to be expected, for example because of geometrical variations (manufacturing tolerances) between the first and second thrust bearings 401, 501. Of course, it will be understood that in another embodiment the converse may be true, i.e. the first thrust bearing 401 may be less stiff (more flexible) than the second thrust bearing 501.

Regarding in-service operation, for example in a gas turbine engine of an aircraft, it must be decided at what level of axial load the load sharing between the first and second thrust bearings 401, 501 should commence. An important factor in this decision is the need to ensure that any prolonged in-service running of an unloaded bearing 401, 501 is avoided. In this regard, the above-mentioned determination of the relative stiffness of the first and second thrust bearings 401, 501 is useful, as follows.

Referring now to FIG. 13, the first thrust bearing 401 is refitted to the slave stand 801 alongside the second thrust bearing 501. In this configuration, the first and second thrust bearings 401, 501 are separated by an axial gap, or clearance gap 901. The axial dimension D901 of the clearance gap 901 is equal to the difference between the above-mentioned axial distances D401a, D501a of the respective inner races 401a, 501a from the common datum point D when the first and second bearings 401, 501 have been properly seated.

In this exemplary embodiment, it is decided that in-service load sharing should begin at an axial load L3 (shown acting from right to left in FIG. 13) of between about 1 kN and 4 kN. To achieve this, a spacer 903 is inserted in the clearance gap 901 between the first and second thrust bearings 401, 501. In order that the (relatively more flexible) second thrust bearing 501 will be loaded before the (relatively less flexible) first thrust bearing 401, the thickness T of the spacer 903 (i.e. its axial dimension) is selected to be smaller than the axial dimension D901 of the clearance gap 901. For example, referring again to FIG. 12d, assuming a minimum allowable thickness T of the spacer 903, when the second thrust bearing 501 is displaced by 0.027 mm the first thrust bearing 401 will start to share the axial load L3 and the second thrust bearing 501 will be loaded by 4 kN. Or, assuming a maximum allowable thickness T of the spacer 903, when the second thrust bearing 501 is displaced by 0.007 mm the first thrust bearing 401 will start to share the axial load L3 and the second thrust bearing 501 will be loaded by 1 kN. Thus, the load-versus-displacement data sets, obtained as described herein above, enable the first and second bearings 401, 501 to be configured such that they will commence to share an in-service axial load at an appropriate load level chosen by the designer.

Accordingly, the first and second bearings 401, 501 may be installed ready for service, for example in a gas turbine engine of an aircraft, as shown in FIG. 14. In this embodiment, the inner races 401a, 501a of the first and second thrust bearings 401, 501 are mounted on a shaft 201 of the engine, the shaft 201 connecting a high pressure turbine and a high pressure compressor (not shown) of the engine in the manner described herein above. In this embodiment, a spacer 903 is disposed in an axial clearance gap 901 between the inner races 401a, 501a.

In this embodiment, a first displacement probe, or sensor 405, is disposed adjacent a front end face of the outer race 401b of the first thrust bearing 401, and a second displacement probe, or sensor 505, is disposed adjacent a rear end face of the outer race 501b of the second thrust bearing 501. It will be understood that in this embodiment the terms front and rear relate to the direction of gas flow through the engine, which is from left to right in FIG. 14. In this embodiment, the displacement sensors 405, 505 are connected to a processor 1001 which is configured to receive displacement measurements therefrom. In this embodiment, the processor 1001 is additionally configured to have access to the above-mentioned data sets relating to the first and second thrust bearings 401, 501.

Figure 12D:
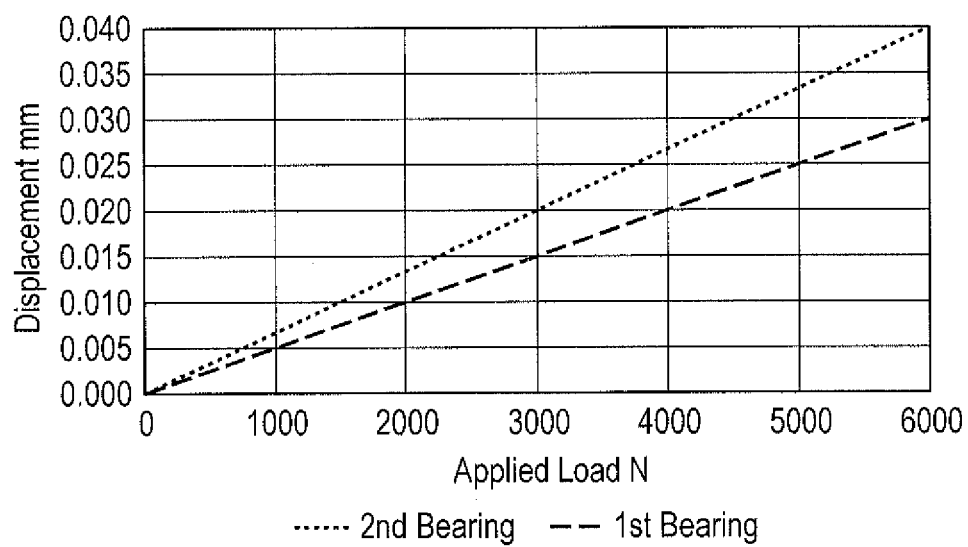

As has been described herein above, when an in-service axial shaft load is applied (from right to left as shown by the arrow in FIG. 14), the resilient elements (diaphragms 701a, 701b) which support the first and second thrust bearings 401, 501 are elastically deformed (as shown by the broken lines in FIG. 14) and the outer races 401b, 501b are axially displaced along with the shaft 201 and the inner races 401a, 501a, whereupon the first and second displacement sensors 405, 505 detect the axial displacements of the respective outer races 401b, 501b. From the measured displacements, the individual loads on each of the first and second thrust bearings 401, 501, and optionally the total load, are determined by the processor 1001 using the calibration curves of the respective first and second data sets (FIGS. 12c and 12d). Of course, the loads could alternatively be determined manually from the measured displacements without the use of the processor 1001.

This knowledge of the individual operating loads can provide confidence that the first and second thrust bearings 401, 501 are sharing the in-service axial load as intended. The loads on the thrust bearings 401, 501 may be monitored throughout the operating range of the gas turbine engine and the detection of bearing failures or anomalies may be indicated by either sudden or gradual changes in the loads. Thus the condition of the bearings may be monitored, and problems may be better predicted and maintenance may be more accurately scheduled. Furthermore, systemic problems (e.g. in the air systems of the gas turbine engine), which tend to manifest themselves as a change in load on the bearings, may be more quickly identified.

Regarding the displacement sensors 405, 505, displacements of the outer races 401b, 501b of the order of 0.4 mm as described herein above are conveniently measured using conventional measuring devices, for example eddy current, laser, optical, or linear variable differential transformer (LVDT) devices. Particularly accurate measurements may be achieved if the measuring devices are positioned close to the radially-outer peripheries of the resilient elements (e.g. diaphragms 701a, 701b) because this will minimise any effects on measurement accuracy of differential expansions between the outer races 401b, 501b and the bearing carriers

403, 503. However, it will be understood that the measuring devices may be positioned in various locations, as long as they are able to detect the displacement of the outer races 401b, 501b. Furthermore, the same or additional measuring devices may be arranged to measure the displacements of the inner races 401a, 501a.

While the first and second thrust bearings 401, 501 may be set up for displacement measurement on the slave stand 801 individually and sequentially as described herein above, alternatively they may be set up on the slave stand 801 simultaneously. Or, the slave stand 801 may be omitted and instead the first and second thrust bearings 401, 501 may be set up for displacement measurement in-situ in their operating environment, for example in a gas turbine engine of an aircraft, some common datum point being provided from which to measure the respective axial distances D401a, D401b, D501a, D501b.

The described load-determination method is appropriate for any and all of the embodiments of bearing arrangements described herein above. Furthermore, while the specifically described embodiment relates to the measurement of axial displacement of first and second thrust bearings 401, 501, it will be understood that the load-determination method is also suitable for measuring the axial displacement of a single, flexibly supported thrust bearing and determining the load on that single thrust bearing.

It will be understood that the invention has been described in relation to its preferred embodiments and may be modified in many different ways without departing from the scope of the invention as defined by the accompanying claims.

Although a bearing arrangement and a method of determining the load thereon in a three-shaft gas turbine engine has been described, the invention is equally applicable to a two-shaft or single-shaft gas turbine engine. As will be apparent to the skilled reader, the invention is appropriate for gas turbine engines used for other purposes than to power an aircraft, for example industrial gas turbine engines or marine gas turbine engines. Furthermore, the invention is not only relevant to gas turbine engines but has wider utility. For example, since the claimed bearing arrangement may be made relatively compact, it may be suitable for application in any rotor, for example of a type used in oil and gas drilling, where an axial load is close to or beyond the capabilities of a single bearing. In these situations, the ability of a bearing to carry loads is limited at high shaft speeds due to centrifugal loads on the rolling elements; hence it is not possible merely to increase the diameter of the bearing in order to cope with the loads placed upon it.

The invention claimed is:

1. A bearing arrangement comprising:
   a first thrust bearing and a second thrust bearing, each of the first thrust bearing and the second thrust bearing including:
   an inner race disposed on a shaft; and
   an outer race supported by at least one resilient element, wherein:
   applying a shaft thrust load elastically deforms the at least one resilient element of the respective outer races of the first thrust bearing and the second thrust bearing so as to axially displace the respective outer races of the first thrust bearing and the second thrust bearing such that the shaft thrust load is shared between the first thrust bearing and the second thrust bearing;
   when in an undeformed condition, each of the resilient elements is within a projected axial length of the respective first thrust bearing and second thrust bearing; and
   when in an elastically deformed condition, each of the resilient elements extends beyond the projected axial length of the respective first thrust bearing and second thrust bearing.

2. The bearing arrangement according to claim 1, wherein the resilient elements are elastically deformed such that the thrust load is substantially equally shared between the first thrust bearing and the second thrust bearing.

3. The bearing arrangement according to claim 1, wherein:
   the outer race of each of the first thrust bearing and the second thrust bearing is supported by two resilient elements; or
   the outer race of each of the first thrust bearing and the second thrust bearing is supported by four resilient elements.

4. The bearing arrangement according to claim 3, wherein the four resilient elements are arranged in pairs.

5. The bearing arrangement according to claim 1, wherein:
   when in the undeformed condition, each of the resilient elements extends substantially perpendicular to an axial direction; or
   when in the undeformed condition, each of the resilient elements is inclined relative to an imaginary line which extends perpendicular to the axial direction.

6. The bearing arrangement according to claim 1, wherein the resilient elements include diaphragms.

7. The bearing arrangement according to claim 6, wherein the diaphragms are curved.

8. The bearing arrangement according to claim 1, wherein the first thrust bearing and the second thrust bearing are axially spaced on the shaft.

9. The bearing arrangement according to claim 8, further comprising a spacer element disposed between the inner races of the respective first thrust bearing and second thrust bearing to define an axial distance between the first thrust bearing and the second thrust bearing.

10. The bearing arrangement according to claim 1, further comprising at least one measurement device configured to measure axial displacements of the outer races of the respective first thrust bearing and second thrust bearing.

11. The bearing arrangement according to claim 1, wherein the outer races of the respective first thrust bearing and second thrust bearing are supported by the respective resilient elements on a bearing housing of a gas turbine engine.

12. A gas turbine engine, comprising the bearing arrangement according to claim 1.

13. A bearing arrangement comprising:
   a first thrust bearing and a second thrust bearing, each of the first thrust bearing and the second thrust bearing including:
   an inner race on a shaft; and
   an outer race supported by at least one resilient element, wherein:
   applying a shaft thrust load axially displaces the respective outer races of the first thrust bearing and the second thrust bearing against resistance from the respective resilient elements of the first thrust bearing and the second thrust bearing so that the shaft thrust load is shared between the first thrust bearing and the second thrust bearing;
   when in an undeformed condition, each of the resilient elements is within a projected axial length of the respective first thrust bearing and second thrust bearing; and when in an elastically deformed condition, each of the resilient elements extends beyond the projected axial length of the respective first thrust bearing and second thrust bearing.

* * * * *